United States Patent [19]

Petersen

[11] 4,228,955
[45] Oct. 21, 1980

[54] SAFETY DEVICE FOR MOBILE IRRIGATION ASSEMBLIES

[76] Inventor: Loyal F. Petersen, P.O. Box 207, Osmond, Nebr. 68765

[21] Appl. No.: 54,095

[22] Filed: Jul. 2, 1979

[51] Int. Cl.³ .............................................. B05B 3/00
[52] U.S. Cl. .............................. 239/177; 239/DIG. 1; 239/710
[58] Field of Search ................. 239/177, 212, DIG. 1; 137/344

[56] References Cited

U.S. PATENT DOCUMENTS

| | | | |
|---|---|---|---|
| 3,533,556 | 10/1970 | Dowd | 239/212 |
| 3,623,663 | 11/1971 | Koinzan | 239/177 |
| 3,628,729 | 12/1971 | Thomas | 137/344 |
| 3,712,544 | 1/1973 | Ririe et al. | 239/212 |
| 4,011,990 | 3/1977 | Meis et al. | 239/177 |

Primary Examiner—Robert B. Reeves
Assistant Examiner—Michael J. Forman
Attorney, Agent, or Firm—Henderson & Sturm

[57] ABSTRACT

This invention relates to pivoted, articulated, mobile irrigation systems in general, and more particularly to an improved safety device which senses a pre-positioned ground engaging means to stop the arc of rotation of the irrigation pipes by contact with the safety device by the ground engaging means to prevent the travel of the irrigation system past a designated point.

2 Claims, 4 Drawing Figures

4,228,955

SAFETY DEVICE FOR MOBILE IRRIGATION ASSEMBLIES

BACKGROUND OF THE INVENTION

Irrigation of crop land at regular intervals during the growing season is an accepted routine in the agricultural industry. To that end many structures and methods have been devised to produce irrigation systems which are reliable, relatively inexpensive when compared to permanent structural installations, ruggedly constructed to provide a long useful life, and which have the capability of irrigating large areas of cropland.

Mobile irrigation systems which comprise a plurality of articulated irrigation pipe sections mounted on ground traversing means which are driven through an arc by motorized means are well known in the art; examples of which may be found by reference to U.S. Pat. Nos. 4,063,569, 4,073,309, 3,979,062 and 3,687,372.

Some of the problems associated with this type of system are; the difficulty in maintaining the individual segments in alignment as the assembly traverses variable terrain, the complicated circuitry and structure necessary to customize the irrigation pattern for a given plot of land, and the failure of the mobile system to cease functioning when an obstruction is present in the arc of rotation of the system.

This last problem has serious potential consequences both for the irrigation system itself and also for the obstructions, which may be trees, a barn, shed, trailer or similar structure.

Most of the systems currently employed have a safety switch incorporated into their design to kill the drive mechanism when the articulated section reach a predetermined degree of misalignment; however, when specific irrigation patterns are desired, it normally entails a complex logic system mechanism, which is costly to install, maintain and repair, and which is not always reliable in operation.

SUMMARY OF THE INVENTION

An object of the present invention is the provision of a mobile irrigation safety device which is simple to manufacture and install, and which provides a positive stopping control over the irrigator.

Another object of this invention is the provision of a control device, which can be incorporated into the safety controls normally found on mobile irrigators with minimal modifications.

A further object of this invention is the provision of a safety device, which is operable by contact with a separate ground engaging means, to stop the movement of the irrigator when it approaches within a predetermined distance of an obstruction.

Still another object of this invention is the provision of an safety device which will permit the operator of a mobile irrigator to allow the system to run unattended without fear of the irrigator deviating from a predetemined arc segment.

Yet another object of this invention is the provision of a safety control which will allow the irrigator to travel in either a clockwise or counterclockwise direction for a predetermined distance.

These and other objects, advantages and novel features of this invention will become apparent from the following detailed description of the invention when considered in conjunction with the accompanying drawings.

DESCRIPTION OF THE PREFERRED EMBODIMENT

Figure 1:
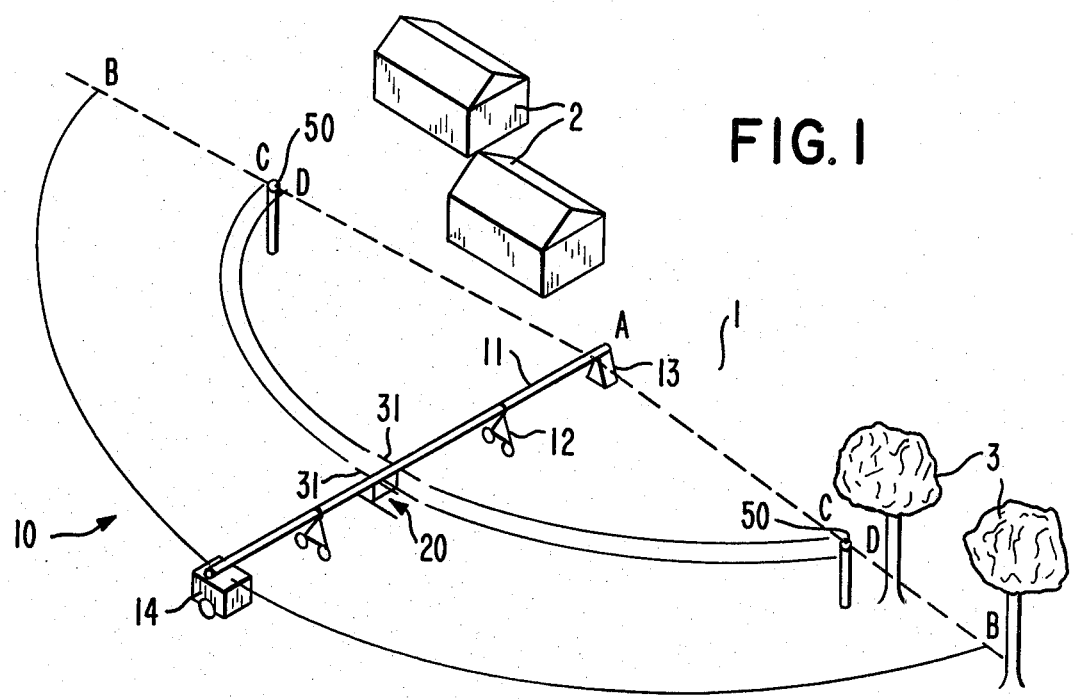
FIG. 1 is a perspective view of a mobile irrigation system which employs the safety device.

FIG. 1 shows the mobile irrigator designated generally as 10 disposed on a plot of land 1 having a plurality of man made structures 2 and naturally occuring obstacles 3. The mobile irrigator 10 comprises a plurality of irrigation pipe segments 11 mounted for movement on wheeled support members 12. The irrigator 10 is rotated about a central pivot point which is normally an irrigation tower 13 by a mobile unit 14. Mounted on the pipe segment 11 are a plurality of control devices 15 which are connected to the mobile unit 14 via electrical connections 16. The control devices 15, which are well known in the art, sense the alignment of the pipe segments 11, and shut down the mobile unit 14 when a certain degree of misalignment is present in the system 10.

Figure 2:
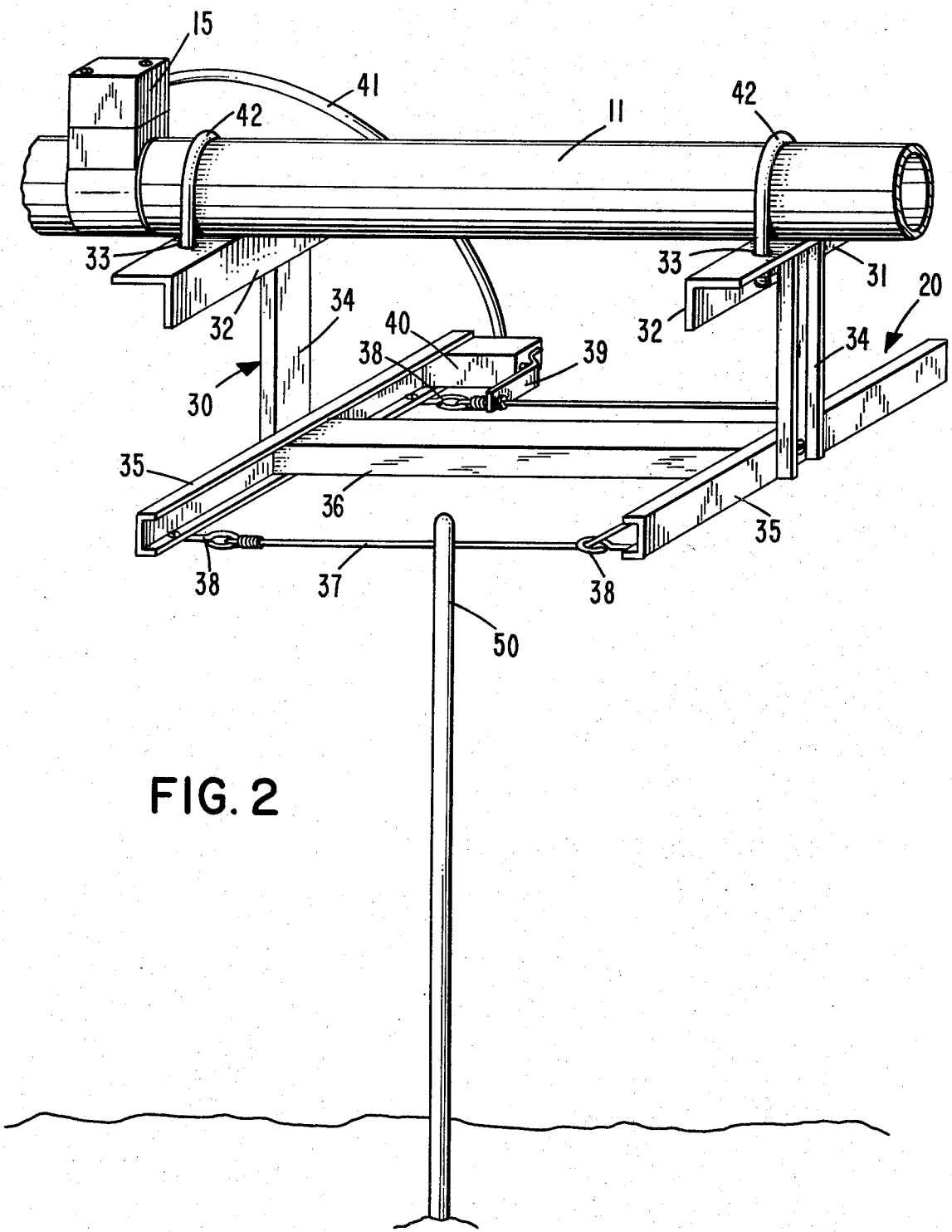
FIG. 2 is a perspective view of the safety device and ground engagable striker rod.

FIG. 2 illustrates the preferred embodiment of the safety device which is designated generally as 20. The safety device 20 comprises a framework 30 suspended beneath the next to last segment 11 of the pivoted pipe segment assembly 10. The framework 30 comprises a plurality of end pieces 31 each consisting of a top mounting bracket 32 having a plurality of apertures 33 disposed therein, a central depending section 34 and an elongated bottom bracket 35. The end pieces 31 are spaced apart and rigidly secured to a horizontal elongated central support member 26, which is secured to the bottom brackets 35, adjacent to the central depending section 34. The elongated central support member 36 completes the framework 30 and provides it with the necessary rigidity.

The components of the framework are manufactured from a metal having the characteristics of strength, rigidity, durability and ease of fabrication.

A flexible lanyard 37 is suspended between and supported by, a plurality of eyelets 38 which are disposed on the elongated bottom bracket 35. An alternate method of supporting the lanyard would be to have either end of the lanyard attached to the bracket 35 via springs while the intermediate portion of the lanyard would be supported by pulleys. The lanyard 37 is operatively connected to an electrical sensor member 39 mounted on one of the bottom brackets via attachment to a single or double acting micro-switch 40. The sensor member 39 is further tied into the mobile unit 14 directly or indirectly via the control member 15, via an electrical connection 41.

The safety device 20 is secured to the pipe segment 11 via a plurality of U-shaped threaded bolts 42 suspended by the pipe segment 11 and extending through the apertures 33 in the top mounting brackets 32 to which the bolts 42 are secured by a plurality of locking nuts (not shown).

The micro-switch 40 is activated by the lanyard 37 contacting a separate striker pole 50 which may be embedded into the ground at any point along the arc circumscribed between the end pieces 31.

When the striker pole 50 contacts the lanyard 37 it causes the lanyard to flex thereby tripping the micro-switch 40 which shuts down the mobile unit 14 to stop the movement of the irrigation assembly 10.

Figure 3:
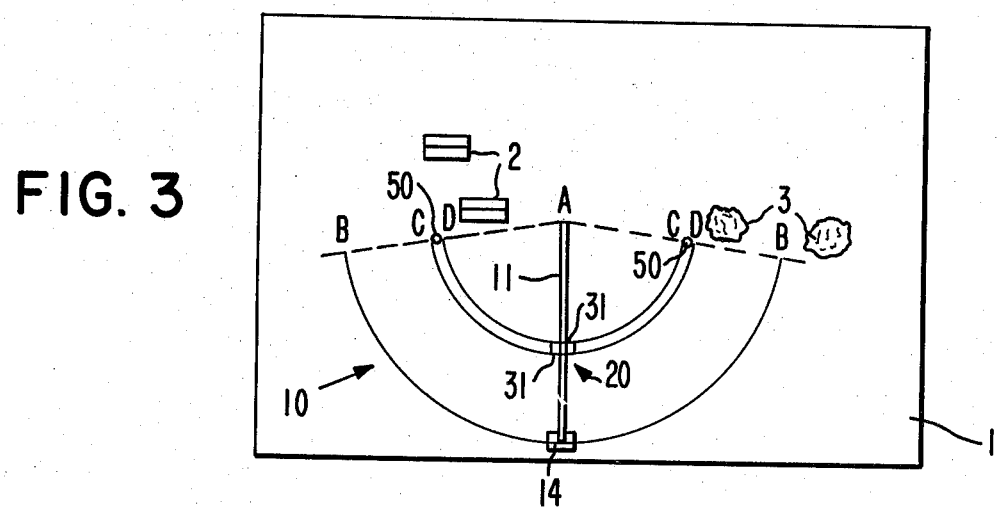
FIG. 3 is a top plan view of an irrigated plot showing the arc of rotation prescribed by an irrigation system employing the safety device.

As can be seen by reference to FIG. 3, the irrigated portion of the plot of land is contained in the radial segment A-B traversed by the mobile irrigator 10. The striker pole or poles 50 would be placed in the area between C and D to provide the irrigation pattern illustrated. It should be apparent that the irrigation pattern can be altered by varying the location of the striker poles 50 along the arcuate segment C-D formed between the end pieces 31 as the irrigation system is pivoted about the irrigation tower 13.

The lanyard 37 may comprise a rope, cable wire etc. and should be fabricated from a material which is flexible, lightweight and durable.

It should be appreciated that the safety device 10 can be mounted on any given pipe segment, even though it is disposed on the last segment in the preferred embodiment shown in FIG. 1. The safety device 10 can be connected directly to the assembly drive mechanism, or indirectly through existing alignment control circuity. The assembly drive mechanism can be incorporated into the irrigation tower alone or as illustrated with a separate mobile unit.

A device constructed in accordance with the principles embodied in this invention, will provide stopping control for a mobile irrigation assembly, which will allow the system to run unattended, without fear that the assembly will collide with a man made or natural obstruction. The striker pole or poles 50 are embedded into the ground a sufficient depth to support and maintain the pole in an upright altitude, and the length of the pole 50 is such that, in its embedded position the top of the striker pole will always be above the level of the lanyard 37 supported by the elongated bottom bracket 35.

Figure 4:
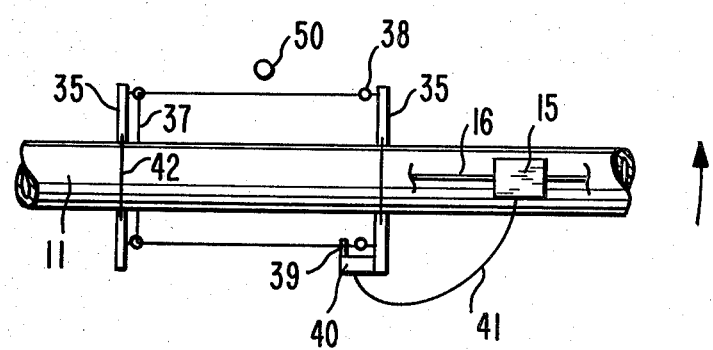
FIG. 4 is a top plan view of the safety device supporting pipe segment, showing the spacing of the lanyard with respect to the pipe.

As can be seen in FIG. 4, the elongated bracket 35 extend perpendicular to and beyond the sides of the pipe segment 11, a substantial distance; to space the portions of the lanyard 37, which are parallel to the pipe segment, and which contact the striker pole, on either side of the pipe. The spacing insures that the striker pole 50, when placed in the arc of rotation of the safety device 10, will contact the lanyard 37 prior to any contact with the pipe segment 11. Since mobile irrigators normally move very slowly, the deflection of the lanyard will trip the micro-switch to 40 to shut down the irrigator drive mechanism, prior to any concievable contact of the striker pole 50 with the pipe segment 11.

Having thereby disclosed the subject matter of this invention, it should be obvious that many modifications substitutions and variations of the invention are possible in light of the above teachings. It is therefore to be understood, that the invention may be practised other than as specifically described, and should be limited only by the breadth and scope of the appended claims.

What I claim is:

1. A safety device for a mobile irrigation assembly having a plurality of pipe segments which are movably mounted for rotation about a pivot point by a drive mechanism wherein the safety device comprises a framework, selectively disposed on one of said plurality of pipe segments, and comprising at least two end pieces connected by a horizontally disposed elongated support member, each of said end pieces composed of a mounting bracket having at least one downwardly depending member, and an elongated bottom portion which projects perpendicular to, and substantially beyond, the sides of said pipe segment, a switch element mounted on the framework and operatively connected to the drive mechanism a flexible member operatively connected to the switch element, and suspended between and supported by the elongated bottom portions of the end pieces, and a separate elongated ground engageable member whose length is dimensioned so as to engage the flexible member at a point in the arc of rotation of said one of said plurality of pipe segments during movement of the mobile irrigation assembly whereby the ground engageable member will deform the flexible member to actuate the switch to disengage the drive mechanism.

2. A safety device as in claim 1; wherein, said flexible member is a lanyard.

* * * * *